United States Patent
Iijima et al.

(10) Patent No.: US 7,575,731 B2
(45) Date of Patent: Aug. 18, 2009

(54) FINE PARTICLES OF TIN-MODIFIED RUTILE-TYPE TITANIUM DIOXIDE AND METHOD OF MAKING THEREOF

(75) Inventors: Tomonori Iijima, Ichihara (JP); Norio Nakayama, Ichihara (JP); Toyoharu Hayashi, Yokohama (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 176 days.

(21) Appl. No.: 11/630,958

(22) PCT Filed: Jun. 29, 2005

(86) PCT No.: PCT/JP2005/012002

§ 371 (c)(1),
(2), (4) Date: Dec. 28, 2006

(87) PCT Pub. No.: WO2006/001487

PCT Pub. Date: Jan. 5, 2006

(65) Prior Publication Data

US 2008/0026210 A1    Jan. 31, 2008

(30) Foreign Application Priority Data

Jun. 29, 2004   (JP) .............................. 2004-191966

(51) Int. Cl.
*C01G 19/02*   (2006.01)
*C01G 23/047*  (2006.01)
*C09C 1/36*    (2006.01)
*B32B 5/16*    (2006.01)

(52) U.S. Cl. .............................. 423/69; 423/71; 423/89; 106/441; 428/328; 428/403

(58) Field of Classification Search .................. 428/403, 428/328; 106/441; 423/69, 71, 89
See application file for complete search history.

(56) References Cited

U.S. PATENT DOCUMENTS

| | | | |
|---|---|---|---|
| 5,650,002 A * | 7/1997 | Bolt ............................. | 106/438 |
| 5,853,887 A * | 12/1998 | Yoshimoto et al. ........... | 428/404 |
| 6,703,131 B1 * | 3/2004 | Kayanoki ..................... | 428/446 |
| 7,338,984 B2 * | 3/2008 | Nakayama et al. ............. | 522/36 |

FOREIGN PATENT DOCUMENTS

| | | | |
|---|---|---|---|
| JP | 02-255532 A | | 10/1990 |
| JP | 02-255532 B2 | | 10/1990 |
| JP | 09-110956 A | | 4/1997 |
| JP | 09-175821 A | | 7/1997 |
| JP | 2001-123115 A | | 5/2001 |
| JP | 2002-194083 A | | 7/2002 |

OTHER PUBLICATIONS

Humin Cheng et al., "Hydrothermal Preparation of Uniform Nanosize Rutile and Anatase Particles", Chemistry of Materials, Apr. 1995, pp. 663-671, vol. 7, No. 4, American Chemical Society.

(Continued)

*Primary Examiner*—H. (Holly) T Le
(74) *Attorney, Agent, or Firm*—Buchanan Ingersoll & Rooney PC (57) ABSTRACT

The present invention relates to fine particles of a tin-modified rutile-type titanium dioxide obtained through the reaction of an aqueous solution of a titanium compound having a Ti concentration of 0.07 to 5 mol/l at a pH in the range of −1 to 3 in the co-presence of a tin compound at a molar ratio of tin to titanium (Sn/Ti) of 0.001 to 2, wherein said fine particle has an Sn/Ti composition molar ratio of 0.001 to 0.5, and a short axis and a long axis of a crystal grain diameter thereof have a length of 2 to 20 nm.

20 Claims, 3 Drawing Sheets

OTHER PUBLICATIONS

X.-Z. Ding et al., "Effect of Tin Dioxide Doping on Rutile Phase Formation in Sol-Gel-Derived Nanocrystalline Titania Powders", NanoStructured Materials, Sep. 1994, pp. 663-668, vol. 4, No. 5, Pergamon, Elsevier Science Ltd.

Hee-Dong Nam et al., "Prepartion of Ultrafine Crystalline $TiO_2$ Powders From Aqueous $TiCl_4$ Solution by Precipitation", Aug. 1998, pp. 4603-4608, vol. 37, Part 1, No. 8, The Japan Society of Applied Physics.

* cited by examiner

FINE PARTICLES OF TIN-MODIFIED RUTILE-TYPE TITANIUM DIOXIDE AND METHOD OF MAKING THEREOF

TECHNICAL FIELD

The present invention relates to fine particles having a high refractive index which are excellent in photo-durability, a sol, a coating liquid containing the sol, a coat film and a resin composition which are excellent in scratch resistance, surface hardness, abrasion resistance, transparency, heat resistance, photo-durability, weather resistance and ultraviolet interrupting property, and are free from the generation of an interference fringe when applied on a substrate, and to a method for producing the same.

BACKGROUND ART

Titanium dioxide is classified into two representative crystal types; rutile type and anatase type. As a sol of fine particles of a metal oxide for a high refractive index, a material having fine particles of an anatase-type titanium dioxide having a refractive index of no=2.56 and ne=2.49 as a main component has been mainly used up to now. On the other hand, a rutile-type titanium dioxide has a refractive index of no=2.61 and ne=2.9 (no: refractive index with respect to ordinary ray, ne: refractive index with respect to extraordinary ray) (Courses in Experimental Science, compiled by The Chemical Society of Japan), and is known for its excellence in optical features such as a high refractive index, ultraviolet absorption and the like, as compared to the anatase type. So, synthesis of fine particles of a rutile-type titanium dioxide and the sol thereof has been actively attempted. However, in reality, fine particles of a rutile-type titanium dioxide and a sol which can be industrially used have not yet been obtained.

For example, in a method for preparing an anatase-type titanium dioxide of a low refractive index type by nature, there has been reported a method comprising adding tin as a doping agent to forcibly change it into a rutile type. According to the method as described in Chem. Mater., Vol. 7, p. 663 (1995) by H. Cheng et al., synthesis is carried out under the conditions including strong acid and high concentration by a hydrothermal method. However, there are drawbacks such that a crystal grain diameter exceeds 20 nm due to high temperature of 220 degree centigrade and a good rutile-type titanium dioxide is not obtained because tin dioxide is mixed. Furthermore, according to the method as described in Nano Mater., Vol. 4, p. 663 (1994) by X. Z. Ding et al., an anatase type is converted into a rutile type by having a mixed solution of titanium tetrabutoxide dispersed in water and ethanol as a raw material, and adding tin (IV) chloride pentahydrate as a doping agent and hydrochloric acid as a catalyst under a temperature condition of 60 degree centigrade. However, in this method, there is a drawback in that the anatase type remains or a tin oxide is generated. In Patent Document 1, an anatase type is usually changed to a rutile type by adding a tin compound, but there is also the same drawback.

On the other hand, a method for synthesizing a rutile-type titanium dioxide at a low temperature has been reported in Jpn. J. Appl. Phys., Vol. 37, p. 4603 (1998) by H. D. Nam et al. However, according to this method, there is generated an agglomerate having an agglomerated particle diameter of 200 to 400 nm in which long-fibrous rutile-type titanium dioxides are gathered.

On the other hand, a diethylene glycol bisallylcarbonate resin (refractive index: 1.50) of a low refractive index has been used for plastic ophthalmic lenses. However, there have recently been developed a resin lens (refractive index: 1.60 to 1.70) obtained by thermopolymerizing a thiol compound and an isocyanate compound for forming a thiourethane bond as described in Patent Document 2, and a resin lens (refractive index: not less than 1.70) obtained by forming an epithiosulfide bond according to ring opening thermopolymerization of a thioepoxy compound as described in Patent Document 3. However, since plastic lenses have a drawback of easily causing damage due to low scratch resistance, a method comprising preparing a coating liquid using silica sol and an organic silicon compound, and providing a hard coat film on a surface has been carried out.

Meanwhile, since a light curable hard coat film can be easily formed, it has been used as a hard coat film for improving scratch resistance in the same manner.

Furthermore, plastic lenses have a drawback in that impact resistance is low. For that reason, there has been used a method comprising providing a primer film between a substrate and a hard coat film for absorbing impact. However, since the coat film has a low refractive index while the substrate has a high refractive index, an interference fringe appears on the coat film due to the difference in the refractive indexes, causing a problem of bad appearance. For that reason, the refractive index of the hard coat film, the primer film or the light curable hard coat film also needs to be close to the level equivalent to the refractive index of the substrate.

Likewise, a fine particle having a high refractive index which is excellent in photo-durability, weather resistance and the like, a sol thereof and a coating liquid has also been demanded in the fields of plastic deterioration preventive additives, a cosmetic additives, optical members such as a camera lens, an automobile window glass, a plasma display, a liquid crystal display, an EL display, an optical filter and the like, products of a metal material, a ceramics material, a glass material and a plastic material used for adjusting a refractive index, and the like.

Antimony oxide has been recommended as fine particles of a metal oxide and a sol to be added to a coating liquid for obtaining a coat film having a high refractive index up to now. However, since the refractive index of a plastic substrate of a lens is recently not less than 1.6, it is not already possible to use antimony oxide. The antimony oxide itself has a refractive index of 1.7, but it is filled up in an organic silicon compound having a low refractive index or the like, prior to use. Therefore, the refractive index as a coat film becomes even lower than that of a substrate.

As a means to solve this problem, at present, there has been used a method such that fine particles including an anatase-type titanium oxide having a higher refractive index than that of antimony oxide or the like are contained in a hard coat film, a primer film and a light curable hard coat film.

However, it was found that a coat film using fine particles of an anatase-type titanium dioxide is inferior in photo-durability. That is, by a photo-catalytic action of titanium dioxide, the decomposition of an organic substance occurs due to electron-holes generated by photo-absorption, resulting in problems of scratch resistance, surface hardness, abrasion resistance, transparency, heat resistance, photo-durability, weather resistance, ultraviolet interrupting property and the like.

At present, for the purposes of improvement in an interference fringe and photo-durability of a coat film containing fine particles of an anatase-type titanium dioxide, there have been applied, for example, composite fine particles of an anatase-type titanium dioxide and a metal oxide, fine particles of an anatase-type titanium dioxide coated with a metal oxide, a coating liquid using such fine particles or a coat film, as described in Patent Document 4.

All of them aim to achieve inactivation of fine particles of an anatase-type titanium dioxide coated with a metal oxide. By coating fine particles of titanium dioxide with a metal oxide as described above, photo-durability is improved. However, since titanium dioxide in use is an anatase type, a refractive index is about 2.5. When fine particles are coated with a metal oxide in order to enhance the photo-durability, the refractive index is greatly lowered such that it is lower than a refractive index inherent in an anatase-type titanium dioxide. So, the effect for enhancing a refractive index of a coat film is low. Even though the refractive index is enhanced by reducing the amount of a metal oxide to be used for coating, photo-durability becomes insufficient. So, when fine particles are used for a high refractive index substrate, and particularly, an ophthalmic lens substrate having a refractive index of not less than 1.70, in reality, there are some difficulties in enhancing a refractive index of a coat film while maintaining photo-durability so that an interference fringe cannot completely be removed.

On the other hand, in reality, fine particles of a rutile-type titanium dioxide having a refractive index higher than that of the conventional anatase-type titanium dioxide and the sol thereof have not been used as described above.

Patent Document 1: Japanese Patent No. 2783417
Patent Document 2: Japanese Patent Laid-open No. 1997-110956
Patent Document 3: Japanese Patent Laid-open No. 2002-194083
Patent Document 4: Japanese Patent Laid-open No. 2001-123115

DISCLOSURE OF THE INVENTION

The present invention is to provide a hard coating liquid, a primer coating liquid, a light curable hard coating liquid, a coat film or a resin composition which is free from the generation of an interference fringe when applied on an optical substrate having a refractive index of not less than 1.60 and particularly not less than 1.70, and is excellent in scratch resistance, surface hardness, abrasion resistance, adhesiveness, transparency, heat resistance, photo-durability, weather resistance, ultraviolet interrupting property and the like.

In order to solve the above object, the present inventors have conducted an extensive study, and as a result, have found that tin compounds hitherto known as a sintering agent prevent long-fibrous titanium dioxides and at the same time prevent their agglomeration, thus obtaining fine particles of a rutile-type titanium dioxide and a sol which is excellent in dispersability.

That is, the present invention relates to a hard coating liquid, a primer coating liquid or a light curable hard coating liquid which contains as an essential component, one or more of selected from organic silicon compounds, its hydrolysate and its condensate, a resin such as polyurethane, polyester and the like, or a light curable monomer as a matrix component, and contains fine particles obtained by coating fine particles of a tin-modified rutile-type titanium dioxide having a crystal grain diameter of 2 to 20 nm coated with a metal oxide. Also, the present invention relates to a coat film or a resin composition which is free from the generation of an interference fringe which is formed on a substrate of a resin or an inorganic substance having a refractive index of from 1.6 to 1.8. More particularly, the invention relates to:

1. a fine particle of a tin-modified rutile-type titanium dioxide obtained through the reaction of an aqueous solution of a titanium compound having a Ti concentration of 0.07 to 5 mol/l at a pH in the range of −1 to 3 in the co-presence of a tin compound at a molar ratio of tin to titanium (Sn/Ti) of 0.001 to 2, wherein said fine particle has an Sn/Ti composition molar ratio of 0.001 to 0.5, and a short axis and a long axis of a crystal grain diameter thereof have a length of 2 to 20 nm;

2. the fine particle of a tin-modified rutile-type titanium dioxide as set forth in 1, wherein said fine particle of a tin-modified rutile-type titanium dioxide is coated with one or more metal oxides;

3. the fine particle of a tin-modified rutile-type titanium dioxide as set forth in 1 or 2, wherein a refractive index is from 2.0 to 2.8;

4. the fine particle of a tin-modified rutile-type titanium dioxide as set forth in any one of 1 to 3, wherein a crystal of aggregated fine particles comprising said fine particles of a tin-modified rutile-type titanium dioxide has an average agglomerated particle diameter of from 10 to 100 nm;

5. a sol comprising the fine particles of a tin-modified rutile-type titanium dioxide as set forth in any one of 1 to 4 dispersed in water or an organic solvent;

6. a coating liquid comprising the fine particles of a tin-modified rutile-type titanium dioxide as set forth in any one of 1 to 4 and at least one of selected from the group of consisting of an organic silicon compound, its hydrolysate, and its condensate;

7. a hard coat film obtained by curing using the coating liquid as set forth in 6;

8. a coating liquid comprising one or more kinds of resins or resin monomers and the fine particles of a tin-modified rutile-type titanium dioxide as set forth in any one of 1 to 4;

9. a primer film obtained by curing using the coating liquid as set forth in 8;

10. a coating liquid comprising one or more kinds of light curable monomers and the fine particles of a tin-modified rutile-type titanium dioxide as set forth in any one of 1 to 4;

11. a hard coat film obtained by curing using the coating liquid as set forth in 10;

12. the hard coat film as set forth in 7, wherein a refractive index is from 1.5 to 1.8;

13. the primer film as set forth in 9, wherein a refractive index is from 1.5 to 1.8;

14. the hard coat film as set forth in 11, wherein a refractive index is from 1.5 to 1.8;

15. a substrate provided with the hard coat film as set forth in 7 or 12;

16. a substrate provided with the primer film as set forth in 9 or 13;

17. a substrate provided with the hard coat film as set forth in 11 or 14;

18. a substrate comprising the coat film as set forth in 7 or 12 provided on the primer film as set forth in 9 or 13;

19. the substrate as set forth in any one of 15 to 18, wherein the substrate has a refractive index of from 1.6 to 1.8;

20. the substrate as set forth in any one of 15 to 19, wherein the substrate is a resin having a thiourethane bond or an epithiosulfide bond; and 21. a substrate further comprising an antireflection film provided on the substrate as set forth in any one of 15 to 20.

EFFECT OF THE INVENTION

The fine particles of a tin-modified rutile-type titanium dioxide of the present invention cannot be achieved in a conventional production method, and fine particles having a high refractive index and a sol thereof which are not obtainable from an anatase type can be provided. When fine particles obtained by coating the fine particles of a tin-modified rutile-type titanium dioxide with a metal oxide and the sol thereof are applied to a coating liquid and a coat film, there is no interference fringe appeared in a substrate with a hard coat, a primer, and a light curable coat film formed thereon, where the substrate has a high refractive index of not less than 1.60 and particularly not less than 1.70. Thus, it is possible to provide a coat film or a resin composition which is excellent in photo-durability.

Furthermore, the present invention is also able to provide a material which is excellent in scratch resistance, surface hardness, abrasion resistance, transparency, heat resistance, weather resistance, ultraviolet interrupting property and the like for a substrate with a hard coat, a primer or a light curable hard coat film formed thereon having a high refractive index of not less than 1.60 and particularly not less than 1.70.

BEST MODE FOR CARRYING OUT THE INVENTION

The present invention will be described in more detail below.

The present invention relates to fine particles of a tin-modified rutile-type titanium dioxide obtained through the reaction of an aqueous solution of a titanium compound having a Ti concentration of 0.07 to 5 mol/l at a pH in the range of −1 to 3 in the co-presence of a tin compound at a molar ratio of tin to titanium (Sn/Ti) of 0.001 to 2, wherein said fine particle has an Sn/Ti composition molar ratio of 0.001 to 0.5, a short axis and a long axis of a crystal grain diameter thereof have a length of 2 to 20 nm, and an average agglomerated particle diameter of a crystal of a fine particle agglomerate of 10 to 100 nm.

Incidentally, the crystal grain diameter mentioned herein refers to a so-called primary particle diameter and is represented by the length of a-axis and b-axis direction as described in Handbook of Chemical Engineering, Revised 3rd edition (Basic, published by Maruzen Co., Ltd.). In the present specification, they are called a short axis and a long axis respectively. Furthermore, the average agglomerated particle diameter refers to a particle diameter resulted from agglomeration of primary particles.

First, a method for preparing fine particles of a tin-modified rutile-type titanium dioxide will be explained.

The tin compound used in the present invention is not particularly limited. Preferable concrete examples thereof include tin salt compounds such as tin chloride, tin nitrate, tin sulfate, stannate and the like; and tin compounds selected from oxide, hydroxide, metal tin and the like. The titanium compound used in the present invention is not particularly limited. Preferable concrete examples thereof include titanium compounds selected from titanium dioxide chloride, titanium sulfate, titanium nitrate, titanium alkoxide, hydration acidic titanium (including those obtained by subjecting a titanium compound to hydrolysis in advance under alkaline conditions as well) and the like.

First, a tin compound is added to an aqueous solution and then a titanium compound is added thereto. The tin compound and the titanium compound may be added at the same time or either of them may be added first. Furthermore, a mixed compound may also be used. A preferable reaction medium is water, but an organic solvent such as alcohol and the like or a mixed medium of water and an organic solvent may be used.

For the amount of the tin compound to be used for the reaction as a modification agent for controlling crystal growth of rutile-type titanium dioxides, a molar ratio of tin to titanium (Sn/Ti) is from 0.001 to 2 and preferably from 0.01 to 1. When the amount of tin is less than the above range, although a rutile-type titanium dioxide is generated, a crystal grain diameter and an agglomerated particle diameter become larger. Therefore, there is a possibility to deteriorate the dispersability. Further, when it is used as a coat film, there is a possibility of decrease in the transparency of the coat film. When the amount is more than the above range, although the synthesis of fine particles of a rutile-type titanium dioxide can be carried out, the time required for the reaction becomes longer. In this case, there is a possibility that fine particles of a rutile-type titanium dioxide with the tin compound in a large amount attached thereto may be obtained. Furthermore, when the amount is greater than the above range, the amount of residual tin compound becomes great, so there is a possibility to deteriorate the particle refractive index.

The Ti concentration in the reaction solution is from 0.07 to 5 mol/l and preferably from 0.1 to 1 mol/l. In the Ti concentration which is lower than the above range, even though a tin compound is added in the range of 0.01 to 0.03 of Sn/Ti (molar ratio), there is a possibility to generate fine particles of a mixed titanium dioxide of an anatase type and a rutile type. Likewise, in the Ti concentration which is lower than the above range, when a tin compound is added in the range of greater than 0.03 of Sn/Ti (molar ratio), there is a possibility to generate mixed fine particles of titanium dioxide and tin oxide having a rutile-type tin oxide.

The pH of the reaction solution is preferably from −1 to 3. As needed, the pH is adjusted with hydrochloric acid, nitric acid or the like. When the reaction is carried out under the condition of a pH of greater than 3 and when a tin compound is not added, an anatase-type titanium dioxide could be resulted. In order to avoid this, when a tin compound is added to obtain a rutile structure, there is a possibility to generate a different substance other than a rutile-type titanium dioxide such as a tin oxide or the like.

The reaction temperature is not particularly limited as long as the Ti concentration and pH are in the above range. But the reaction temperature is preferably from −10 to 100 degree centigrade and more preferably from 20 to 60 degree centigrade. The time required for the completion of the reaction can be determined depending on the reaction temperature, but the reaction is usually carried out for 0.5 to 10 hours.

For the amount of the tin compound contained in a fine particle of a tin-modified rutile-type titanium dioxide generated by the above reaction, an Sn/Ti molar ratio is preferably from 0.001 to 0.5. When the amount of tin is less than the above range, a particle diameter of the fine particle of a rutile-type titanium dioxide becomes larger. Thus, there is a possibility to deteriorate the dispersability. Further, when the amount is more than the above range, although crystal growth and agglomeration are controlled more efficiently to obtain fine particles having a small particle diameter, fine particles of a rutile-type titanium dioxide with the tin compound in a large amount attached thereto are obtained. As a result, there is a possibility to generate fine particles having a low refractive index.

A reaction mechanism for obtaining fine particles of a tin-modified rutile-type titanium dioxide of the present invention has not at present been fully clarified, but it is characterized in that its surface is modified with a tin compound. It is assumed that a tin compound used as a raw material, tin ion dissociated in a solution, a tin compound generated in a solution by hydrolysis or the like is attached to the surface of titanium dioxide through coordinate bond, adsorption, chemical bond or the like. Further, it is assumed that this happens because, by adding a tin compound as a modification agent under the formation condition of a rutile-type titanium dioxide, not an anatase type by nature, thus resulting in suppressing crystal growth in the direction of a long axis. This can also be observed from the fact that the amount of the modified tin compound necessary for obtaining fine particles of a tin-modified titanium dioxide in which a crystal grain diameter of fine particles is from 2 to 20 nm is far off from the amount for complete coverage of titanium dioxide, and a molar ratio to titanium is small that is from 0.001 to 0.5.

The reaction product obtained as described above may be used as fine particles of a tin-modified rutile-type titanium dioxide at the present state or a sol thereof, and may be subjected to a desired post-treatment. That is, vacuum concentration using an evaporator, purification according to a known method such as ultrafiltration or the like, or concentration to an appropriate concentration can also be carried out. Also, a white precipitate can be obtained by centrifugation and then can be re-dispersed in water or other desired medium. A sol containing fine particles of a tin-modified rutile-type titanium dioxide which are dispersed in water can also be used as a sol containing fine particles of a tin-modified rutile-type titanium dioxide which are dispersed in an organic solvent by using solvent substitution to an organic solvent such as alcohols including methanol and the like, cellosolves including 2-methoxyethanol and the like.

The surface of fine particles of a tin-modified rutile-type titanium dioxide obtained according to the present invention may be modified by carboxylic acid such as acrylic acid, glycolic acid and the like, hydroxycarboxylic acid, amine or an organic silicon compound such as (3-glycidoxypropyl) trimethoxysilane and the like, whereby it is also possible to use the resultant as fine particles of the surface-modified tin-modified rutile-type titanium dioxide and a sol thereof.

In the present invention, when the fine particles of a tin-modified rutile-type titanium dioxide synthesized as described above or the sol thereof is used for coating or for a resin composition, it is needed to impart photo-durability in order to prevent deterioration of neighbor organic substances due to photo-catalytic properties of titanium dioxide. For this purpose, fine particles of a tin-modified rutile-type titanium dioxide are coated with a metal oxide. Incidentally, coating stated herein refers to both the surface of fine particles completely or partly covered.

The metal oxide used for the above coating is preferably an oxide of a metal such as Zr, Si, Al, Sb, Sn, Mo, Nb, Zn, Ta, Fe, W, Bi, Ce, Pb, Cu, Y, In, V, Mg, La or the like. These oxides may be used alone or in combination of two or more kinds for coating. The surface may be coated with several individual metal oxides, with a mixture of several metal oxides, with a metal oxide as a solid solution, or it may be coated with a metal oxide and further coated with another metal oxide.

Fine particles of a tin-modified rutile-type titanium dioxide coated with a metal oxide thus obtained can adjust a refractive index and photo-durability of the fine particle of a tin-modified rutile-type titanium dioxide coated with a metal oxide itself, depending on the kind and the amount of the metal oxide to be selected as a coating layer. Photo-durability can be imparted and the refractive index can be adjusted in the range of 2.0 to 2.8. The amount of the metal oxide to be used is from 0.05 to 1.5 and preferably from 0.1 to 1 in terms of the weight ratio to the fine particle of a tin-modified rutile-type titanium dioxide. When the amount is less than the above range, photo-catalytic properties of titanium dioxide cannot be suppressed so that there is a possibility to deteriorate photo-durability of the coat film. Further, when the amount is greater than the above range, the refractive index of the fine particles is lowered, thus there is a possibility that such fine particles cannot be used with the substrate having a refractive index of not less than 1.7.

A method for coating with the metal oxide can be carried out by applying a known method to a sol of fine particles of a tin-modified rutile-type titanium dioxide. That is, a compound that is a raw material is dissolved in water and mixed with a sol of fine particles of a tin-modified rutile-type titanium dioxide, followed by stirring. The mixture may be heated as required. The pH may also be adjusted as needed.

When coating with silicon dioxide, examples of the raw material compounds to be used include sodium silicate, potassium silicate and the like.

Meanwhile, when coating with aluminum oxide, examples of the raw material compounds to be used include sodium aluminate, aluminum sulfate, aluminum chloride and the like.

Further, when coating with antimony oxide, examples of the raw material compounds to be used include antimony chloride, antimony alkoxide, antimony acetate, antimony oxide, potassium antimonyl tartrate, potassium hexahydroxoantimonate, potassium antimonate, sodium antimonate and the like.

Further, when coating with zirconium oxide, coating can also be carried out according to a method as described in Japanese Patent Laid-open No. 2004-18311 which is found by the present inventors. Examples of the raw material compounds to be used include zirconium oxychloride, zirconium oxysulfate, zirconium oxynitrate, zirconium oxycarbonate and the like.

Further, when coating with molybdenum oxide, examples include hexaammonium heptamolybdate tetrahydrate, molybdenum oxide and the like.

Further, when coating with niobium oxide, examples include niobium ethoxide, sodium niobate and the like.

In the present invention, by utilizing the difference in isoelectric point of the metal oxide to be used for coating, it is also possible to change the dispersability of fine particles of a tin-modified rutile-type titanium dioxide coated with a metal oxide. For example, when Si, Nb, W, Mo, Sb and the like are used, a sol excellent in the dispersability particularly under basic condition can be obtained. Further, for example, when Zr, Bi and the like are used, a sol excellent in the dispersability particularly under acidic condition can be obtained.

The reaction product obtained as described above may be used as a sol containing fine particles of a tin-modified rutile-type titanium dioxide coated with a metal oxide as it is, or may be subjected to a desired post-treatment. That is, vacuum concentration using an evaporator, purification according to a known method such as ultrafiltration or the like, or concentration to an appropriate concentration can also be carried out. Also, a white precipitate can be obtained by centrifugation and then can be re-dispersed in water or other desired medium. An aqueous sol containing fine particles of a tin-modified rutile-type titanium dioxide coated with a metal oxide which are dispersed in water can also be used as a sol containing fine particles of a tin-modified rutile-type titanium dioxide coated with a metal oxide which are dispersed in an organic solvent by using solvent substitution to an organic solvent such as alcohols including methanol and the like, and cellosolves including 2-methoxyethanol and the like.

The surface of fine particles of a tin-modified rutile-type titanium dioxide coated with a metal oxide obtained according to the present invention is modified by a carboxylic acid such as acrylic acid, glycolic acid and the like, hydroxycarboxylic acid, amine or an organic silicon compound such as (3-glycidoxypropyl)trimethoxysilane and the like, whereby it is also possible to use the resulting solution as a sol containing fine particles of the surface-modified tin-modified rutile-type titanium dioxide coated with a metal oxide.

In fine particles of a tin-modified rutile-type titanium dioxide or fine particles of a tin-modified rutile-type titanium dioxide coated with a metal oxide obtained according to the present invention, a short axis and a long axis of a crystal grain diameter thereof have a length of preferably from 2 to 20 nm, and an average agglomerated particle diameter is preferably from 10 to 100 nm. When the crystal grain diameter is less than 2 nm and a coat film is prepared by using a coating liquid containing these fine particles, there is a possibility that scratch resistance and hardness may become insufficient, and a refractive index to be inherently obtained may not be obtained. When the diameter is greater than 20 nm, there is a possibility to cause light scattering. When the average agglomerated particle diameter is more than 100 nm, the obtained coat film is whitened so that it might become opaque.

Next, a method for preparing a coat film is explained.

The hard coat film in the present invention is formed from a coating liquid containing matrix forming components (A) and (B) as essential components.

The component (A) is composed of at least one silicon-containing substance selected from the group consisting of an organic silicon compound, its hydrolysate, a partial hydrolysate and a partial condensate. The organic silicon compound used herein is not particularly limited, but the organic silicon compounds represented by the following general formula (1) is preferably used.

$$(R^1)_a(R^2)_b Si(OR^3)_{(3-a-b)} \quad (1)$$

wherein $R^1$ and $R^2$ are each an organic group having an alkyl group, a halogenated alkyl group, a vinyl group, an allyl group, an acyl group, an acryloxy group, a methacryloxy group, a mercapto group, an amino group, an epoxy group and the like, and are bonded to silicon by a Si—C bond; and $R^3$ is an organic group such as an alkyl group having 1 to 8 carbon atoms, an alkoxy alkyl group, an acyl group and the like.

As $R^1$, $R^2$ and $R^3$ in the general formula (1), concrete examples of the organic group having an alkyl group include a methyl group, an ethyl group, a propyl group and the like; concrete examples of the organic group having a halogenated alkyl group include a chloromethyl group, a 3-chloropropyl group and the like; concrete examples of the organic group having an acyl group include an acetoxypropyl group and the like; concrete examples of the organic group having an acryloxy group include a 3-acryloxypropyl group and the like; concrete examples of the organic group having a methacryloxy group include a methacryloxypropyl group and the like; concrete examples of the organic group having a mercapto group include a mercaptomethyl group and the like; concrete examples of the organic group having an amino group include a 3-aminopropyl group and the like; concrete examples of the organic group having an epoxy group include a 3-glycidoxypropyl group and the like; and concrete examples of the alkoxy alkyl group include a methoxyethyl group and the like.

Concrete examples of the compound represented by the general formula (1) include methyltrimethoxysilane, ethyltriethoxysilane, chloromethyltrimethoxysilane, 3-chloropropyltriethoxysilane, 3-chloropropyltriacetoxysilane, vinyltrimethoxysilane, vinyltriethoxysilane, allyldimethoxysilane, allyltriethoxysilane, acetoxypropyltrimethoxysilane, 3-acryloxypropyldimethylmethoxysilane, (3-acryloxypropyl)methyldimethoxysilane, methacryloxymethyltriethoxysilane, methacryloxypropyldimethylethoxysilane, methacryloxypropyldimethylmethoxysilane, methacryloxypropylmethyldiethoxysilane, methacryloxypropylmethyldimethoxysilane, methacryloxypropyltriethoxysilane, methacryloxypropyltrimethoxysilane, mercaptomethylmethyldiethoxysilane, mercaptomethyltrimethoxysilane, 3-mercaptopropylmethyldimethoxysilane, 3-mercaptopropyltriethoxysilane, 3-mercaptopropyltrimethoxysilane, p-aminophenyltrimethoxysilane, 3-aminipropylmethyldiethoxysilane, 3-aminopropyltriethoxysilane, 3-aminopropyltrimethoxysilane, (3-glycidoxypropyl)dimethylethoxysilane, (3-glycidoxypropyl)methyldiethoxysilane, (3-glycidoxypropyl)methyldimethoxysilane, (3-glycidoxypropyl) trimethoxysilane and the like.

In the present invention, of the organic silicon compounds represented by the general formula (1), (3-glycidoxypropyl) trimethoxysilane, (3-glycidoxypropyl)methyldiethoxysilane, (3-glycidoxypropyl)methyldimethoxysilane and hydrolysates, partial hydrolysates and partial condensates thereof are more suitably used. Furthermore, these compounds can be used alone or in combination as a mixture.

Meanwhile, a compound represented by the following general formula (2) can also be used together as an organic silicon compound in addition to the aforementioned organic silicon compounds.

$$Si(OR^3)_4 \quad (2)$$

wherein $R^3$ is an organic group such as an alkyl group having 1 to 8 carbon atoms, an alkoxy alkyl group, an acyl group and the like.

Concrete examples of $R^3$ in the general formula (2) include the same as those of $R^3$ in the general formula (1).

Concrete examples of the compound represented by the general formula (2) include tetramethoxysilane, tetraethoxysilane, tetraisopropoxysilane, tetra-n-propoxysilane, tetra-n-butoxysilane, tetra-tert-butoxysilane, tetra-sec-butoxysilane and the like. Furthermore, these compounds can be used alone or in combination as a mixture.

Hydrolysis of the organic silicon compound represented by the general formula is carried out by adding hydrochloric acid or the like. According to this, the partial or entire alkoxy group is hydrolyzed. Hydrolysis may be carried out by diluting the organic silicon compound with alcohols such as methanol and the like; cellosolves such as methyl cellosolve and the like; esters such as ethyl acetate and the like; ethers such as tetrahydrofuran and the like; ketones such as acetone and the like; halogenated hydrocarbons such as chloroform and the like; and hydrocarbons such as toluene, heptane and the like.

The component (B) is fine particles of a tin-modified rutile-type titanium dioxide in which a crystal grain diameter is controlled in the range of 2 to 20 nm and an average agglomerated particle diameter is controlled in the range of 10 to 100 nm, or fine particles obtained by coating the fine particles with a metal oxide, and a sol of the fine particles dispersed in water. The component (B) may also be a sol containing such fine particles which are dispersed in alcohols such as methanol and the like; cellosolves such as methyl cellosolve and the like; esters such as ethyl acetate and the like; ethers such as tetrahydrofuran and the like; ketones such as acetone and the like; halogenated hydrocarbons such as chloroform and the like; and hydrocarbons such as toluene, heptane and the like, which is obtained by solvent substitution.

In the present invention, the proportion of a solid content (fine particles) of (B) to be contained in a hard coat film obtained by coating and curing the above coating liquid is from 1 to 80 weight % and preferably from 10 to 60 weight %. When the proportion is less than the above range, an effect of adding fine particles such as enhancement of the refractive index or the like becomes smaller. When the proportion is more than the above range, there is a possibility of decrease in performance of the coat film such as decrease in adhesiveness, occurrence of crack or the like.

In accordance with the above method, a refractive index of 1.50 to 1.80 can be obtained. Further, in order to prevent an interference fringe, the refractive index of the coat film needs to be adjusted in the range of ±0.05 and preferably in the range of ±0.02 relative to the refractive index of the substrate. For this reason, when the refractive index of the substrate is from 1.60 to 1.80, the refractive index of the hard coat film needs to be adjusted in the range of 1.60 to 1.80 by changing the amount of the component (B) to be added within the above range in accordance with the refractive index of the substrate. In case of a substrate having a low refractive index such as a diethylene glycol bis(allylcarbonate) resin substrate having a refractive index of around 1.50, it is naturally possible to achieve a desired refractive index by reducing the amount of the component (B) to be added.

In order to correspond to the above substrate, the refractive index of fine particles of a tin-modified rutile-type titanium dioxide or fine particles obtained by coating the fine particles with a metal oxide to be used is from 2.0 to 2.8 and particularly preferably from 2.3 to 2.8 in order to correspond to a substrate having a refractive index of not less than 1.70. When a substrate has a refractive index of less than 1.70, it is possible to achieve a high refractive index by adding fine particles of a tine-modified rutile-type titanium dioxide in a small amount as compared to the conventional metal oxide fine particles. So, there is no possibility of occurrence of crack, decrease in adhesiveness or the like resulted from the amount of metal oxide fine particles added too much to the coat film.

The aforementioned fine particles of a tin-modified rutile-type titanium dioxide to be used are preferably subjected to a surface treatment with an organic silicon compound. By the reaction of a hydroxyl group on the surface of fine particles with the organic silicon compound, miscibility with the coat film (a condensate of an organic silicon compound) is further improved and the dispersability into the organic solvent is also improved. Further, by reacting the particle surface with the organic silicon compound of a matrix component upon curing, scratch resistance is improved. As the organic silicon compound to be used, the aforementioned compounds are used. Further, by carrying out a surface treatment with an organic substance such as carboxylic acid, amine and the like, it is also possible to enhance the dispersion stability into an organic solvent.

As the organic silicon compound to be used for the surface treatment, preferably used are the organic silicon compounds as described in the above general formulae (1) and (2). Particularly suitably used are (3-glycidoxypropyl)trimethoxysilane, (3-glycidoxypropyl)methyldiethoxysilane, (3-glycidoxypropyl)methyldimethoxysilane, tetramethoxysilane, tetraethoxysilane and hydrolysates thereof. These compounds can be used alone or in combination as a mixture.

The surface treatment using an organic silicon compound is carried out by a method comprising mixing a solvent containing an organic silicon compound with a sol, heating the mixture in the range of room temperature to 60 degree centigrade for a predetermined period, and then removing the unreacted portion in the mixed solution according to a method such as ultrafiltration, centrifugation or the like. The amount of the organic silicon compound to be used is properly set in consideration of the dispersability into the organic solvent used for the hard coating liquid.

As the carboxylic acid to be used for the surface treatment, acetic acid, propionic acid, acrylic acid, methacrylic acid and the like are preferably used.

Furthermore, as amine to be used for the surface treatment, propylamine, diisopropylamine, butylamine and the like are preferably used.

In the present invention, the organic solvent to be used for a hard coating liquid is not particularly limited. Concrete examples thereof include alcohols such as methanol and the like; cellosolves such as methyl cellosolve and the like; esters such as ethyl acetate and the like; ethers such as tetrahydrofuran and the like; ketones such as acetone and the like; halogenated hydrocarbons such as chloroform and the like; and hydrocarbons such as toluene, heptane and the like. These may also be used in combination of two or more kinds.

As a method for adjusting the hard coating liquid of the present invention, a solution of an organic silicon compound and its hydrolysate, its partial hydrolysate or its partial condensate (component (A)) may be mixed with a sol of fine particles of a tin-modified rutile-type titanium dioxide or fine particles obtained by coating the fine particles with a metal oxide (component (B)) which are dispersed in water, an organic solvent or the like, and then the above organic solvent may be added thereto as needed. Alternatively, the above organic solvent may be added to the component (A) or (B), followed by mixing them.

Meanwhile, although the aforementioned organic silicon compound can be cured without a catalyst, in order to promote the reaction, a curing catalyst may be added.

The curing catalyst for promoting the curing reaction is not particularly limited. Concrete examples thereof include metal complexes such as aluminium acetylacetonate, iron acetylacetonate and the like; alkali metal organic carboxylates such as potassium acetate, sodium acetate and the like; perchlorates such as aluminium perchlorate and the like; organic carboxylic acids such as maleic acid, maleic acid anhydride, fumaric acid, fumaric acid anhydride, itaconic acid, itaconic acid anhydride and the like; nitrogen-containing organic compounds such as methyl imidazole, dicyandiamide and the like; and metal alkoxides such as titanium alkoxide, zirconium alkoxide and the like.

Of these, aluminium acetylacetonate is particularly preferably used from the viewpoints of scratch resistance, pot life and the like.

The amount of the catalyst used as described above is preferably in the range of 0.1 to 5 weight % based on the solid content in the film. When the amount is less than this range, an effect as a catalyst might become lower. On the contrary, when the amount is more than this range, hardness and scratch resistance might become insufficient.

The component (B) is preferably the fine particles of a tin-modified rutile-type titanium dioxide or the fine particles obtained by coating the fine particles with a metal oxide alone. However, other metal fine particles may also be used together though an effect such as improvement of a refractive index or the like may become lower. Examples thereof include colloidal silica, colloidal antimony oxide and the like.

Meanwhile, for the purpose of improvement of the wetting property at the time of coating and the smoothness of the curing film, various surfactants such as a silicon-based surfactant, a fluorine-based surfactant and the like can be contained in the coating liquid. In addition, an ultraviolet absorber, an antioxidant, a charge preventing agent, a disperse dye, a pigment, a coloring matter, a dyeing improving agent and the like can also be added.

The above hard coating liquid is applied and cured on a substrate to have a curing film. As a method for coating the substrate with the curing film, a conventional method such as a dipping method, a spin coating method, a spray coating method and the like can be employed. However, a dipping method or a spin coating method is effectively used, thus preferable.

Before applying the above hard coating liquid on the substrate, it is possible to improve the adhesiveness between the substrate and the curing film or the like by implementing a chemical treatment by acid, alkali, or various organic solvents, a physical treatment by plasma, ultraviolet rays, and the like, a cleaning treatment by using various detergents, or a primer treatment using various resins to the substrate.

The coating film is cured by hot air drying. Curing may be carried out under the curing condition including hot air of from 80 to 200 degree centigrade and preferably from 90 to 120 degree centigrade. The curing time is from 0.5 to 5 hours and particularly preferably from 1 to 2 hours. Further, the thickness of the hard coat film is generally from 0.01 to 30 μm and preferably from 0.5 to 5 μm. When the film thickness is too thin, scratch resistance becomes lower. When it is too thick, there is a possibility to cause problems such as bad appearance, occurrence of crack or the like.

Likewise, when the difference between the refractive index of the primer film and that of the substrate is too big, an interference fringe may be generated. In order to eliminate the interference fringe, it needs to form a primer film having a high refractive index almost equal to that of a lens. The sol containing fine particles of a tin-modified rutile-type titanium dioxide according to the present invention is also suitable as a coating liquid for forming the primer film having a high refractive index.

As a method for preparing the above primer coating liquid, a resin is used instead of the organic silicon compound that is a matrix component in the above hard coat film, whereby the resulting liquid can also be used for a primer film.

The resin to be used is not particularly limited as far as it is a resin usually used for a primer. In the present invention, a resin such as polyurethane, polyester and the like are suitably used.

The method for adjusting the above primer coating liquid is not particularly limited. As the method, there can be cited a method comprising mixing fine particles of the present invention or its sol with the above resin dispersed in a solvent, for example, an aqueous dispersion, to have a primer coating liquid. Alternatively, a monomer of the resin or its partial polymer (prepolymer) and a polymerization catalyst may be added to the coating liquid and polymerized by heating or the like at the step of forming a coat film to have a primer film.

Furthermore, by forming a primer film between the hard coat film and the substrate, impact resistance of the substrate and the adhesiveness can be improved.

The proportion of the solid content of fine particles contained in the primer film is from 1 to 80 weight % and preferably from 10 to 60 weight %. When the proportion is less than this range, effects on the fine particles such as improvement in the refractive index and the like become smaller. When the proportion is more than this range, there is a possibility of decrease in performance of the coat film such as the adhesiveness and the like.

Meanwhile, a light curable monomer is used instead of the organic silicon compound that is a matrix component in the coat film, whereby the resulting liquid can also be used for a light curable hard coat film or the like.

In the above, the light curable monomer is not particularly limited, but an acrylic compound, a methacrylic compound or its partial polymer (prepolymer) is suitably used.

The method for adjusting the above coating liquid is not particularly limited. As the method, there can be cited a method comprising mixing fine particles of the present invention or the sol thereof, an initiator and the like with the above compound dissolved in a solvent to have a coating liquid. At the step of forming a coat film, it is possible to give a curing film by irradiating light of a necessary wavelength for polymerization.

The proportion of the solid content of fine particles contained in the light curable hard coat film is from 1 to 80 weight % and preferably from 10 to 60 weight %. When the proportion is less than this range, effects on the fine particles such as improvement in the refractive index and the like become smaller. When the proportion is more than this range, there is a possibility of deterioration in performance of the coat film such as the adhesiveness and the like.

Likewise, the primer film and the light curable hard coat film which have a refractive index of 1.50 to 1.80 can be obtained in accordance with the above method. However, in order to prevent an interference fringe, the refractive index of the coat film needs to be adjusted in the range of ±0.05 and preferably in the range of ±0.02 relative to the refractive index of the substrate. For this reason, when the refractive index of the substrate is from 1.60 to 1.80, the refractive index of the coat film needs to be adjusted in the range of 1.60 to 1.80 by changing the amount of the component (B) within the above range in accordance with the refractive index of the substrate.

In the present invention, an antireflection film comprising a deposited film of an inorganic oxide provided on each coat film prepared as described above is not particularly limited, and a single-layer or multi-layer antireflection film comprising a deposited film of a known inorganic oxide such as $TiO_2$, $SiO_2$, $Al_2O_3$, $Nb_2O_5$ or the like can be used.

The substrate to be coated and cured with the coating liquid of the present invention may be a substrate to be used for applications of the present invention, for example, an optical member for a lens or the like, and is not particularly limited. The refractive index of an appropriate substrate is more preferably from 1.6 to 1.8. Concrete examples thereof include a resin having a thiourethane bond which has a refractive index of not less than 1.60, a resin obtained by forming an epithiosulfide bond which has a refractive index of not less than 1.70, and the like.

The fine particles, the sol, the coating liquid and the coat film obtained by the present invention can be applied not only to a coat film with a high refractive index of a plastic lens having a high refractive index of not less than 1.60 and particularly not less than 1.70 such as polythiourethane-based (refractive index: 1.67, 1.70) lens having a high refractive index, polythioepoxy based (refractive index: 1.74) lens having a ultra high refractive index or the like, but also to a hard coat film and an antireflection film of a camera lens, an automobile window glass, a plasma display, a liquid crystal display, an EL display, an optical filter and the like.

EXAMPLES

The present invention is now illustrated below with reference to Examples. However, the present invention is not restricted to these Examples.

(Preparation of Fine Particles of a Tin-Modified Rutile-Type Titanium Dioxide and a Sol Thereof)

Example 1

Figure 1:
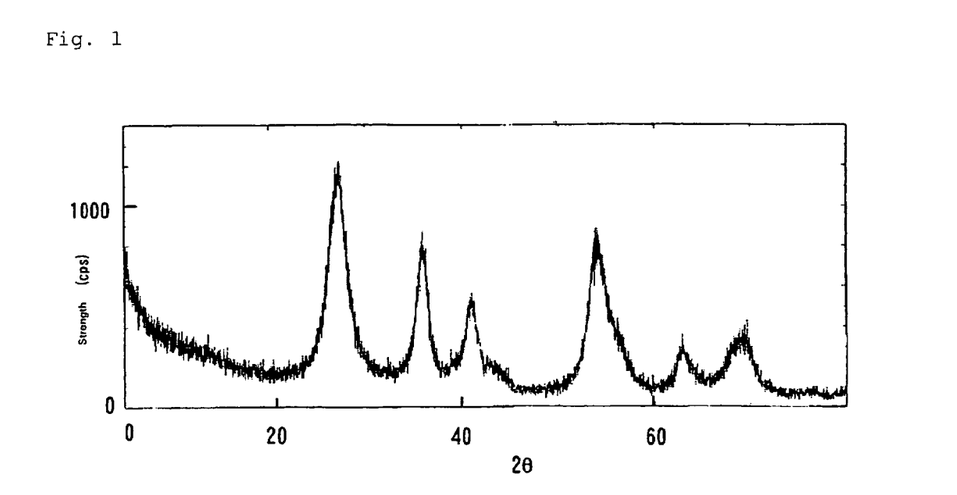
FIG. 1 shows the result of powder X-ray diffraction in Example 1.

Into a 100-ml eggplant type flask, 0.09 g of tin (IV) chloride pentahydrate was introduced and dissolved in 50 ml of ion exchange water, and 5 ml of aqueous hydrochloric acid solution of titanium dioxide chloride (containing 15 weight % of Ti) was added thereto. The pH of the solution was −0.1 (concentration of Ti introduced: 0.45, Sn/Ti molar ratio: 0.01). The reaction mixture was stirred using a magnetic stirrer and heated at 50 degree centigrade for 1 hour, and as a result, a white precipitate was obtained. Centrifugation was carried out, and the white precipitate was recovered and re-dispersed in ion exchange water. Ultrafiltration was carried out to obtain a sol containing 1.3 weight % of the solid content. Powder X-ray diffraction measurement and electron microscope observation of this solid content were carried out. The powder X-ray diffraction was measured after drying up by hot air at 120 degree centigrade for 2 hours. The results thereof are shown in FIG. 1. The crystal grain diameter was calculated by using the Debye-Sherrer formula from full width at half maximum of the diffraction peak. As a result, an average short axis and an average long axis of a crystal grain diameter had a length of 5 nm and 8 nm respectively. A transmission electron microscope was used for the electron microscope observation to observe the diluted sol added dropwise to a mesh at 0.2M magnifications and 2M magnifications. The result showed the rutile type titanium dioxide having an average agglomerated particle diameter of 45 nm. The element molar ratio of Sn/Ti according to the inductively coupled plasma analysis was 0.01. 10 g of a sol containing 1.3 weight % of the above solid content was taken, 130 mg of polyvinylpyrrolidone was added and 10 g of water was further added thereto. The resulting mixture was subjected to spin coating on a quartz substrate and dried at 120 degree centigrade, and then the refractive index was quickly measured by using an ellipsometer. The refractive index of the solid content was evaluated from the volume fraction of the solid content contained to obtain n=2.75.

Example 2

Figure 2:
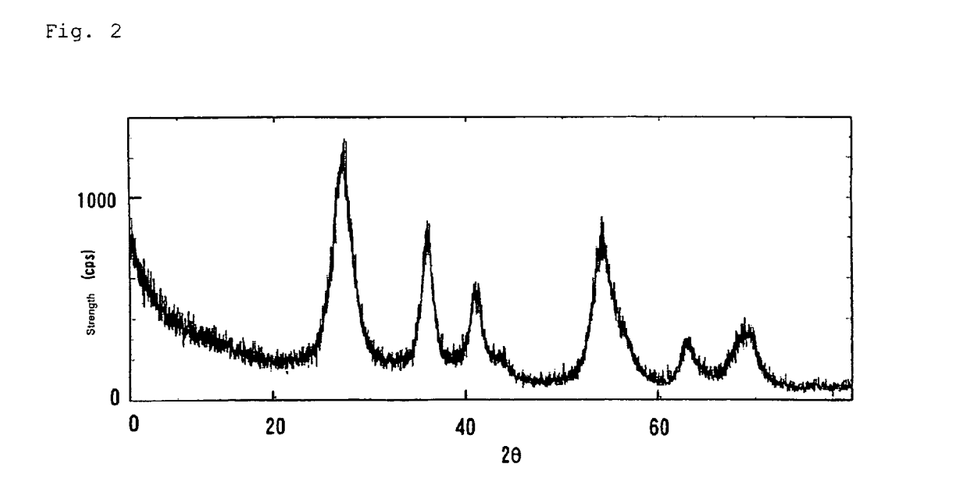
FIG. 2 shows the result of powder X-ray diffraction in Example 2.

The same operation as in Example 1 was carried out except that 0.27 g of tin (IV) chloride pentahydrate in Example 1 was used (concentration of Ti introduced: 0.45, Sn/Ti: 0.03). The solid content of the obtained sol was analyzed in the same manner as in Example 1. The result showed the rutile-type titanium dioxide having an average short axis and an average long axis of the crystal grain diameter of 5 nm and 8 nm respectively, and an average agglomerated particle diameter of 23 nm. The element molar ratio of Sn/Ti was 0.02. The refractive index of the solid content was evaluated in the same manner as in Example 1 to obtain n=2.72. The results of powder X-ray diffraction are shown in FIG. 2.

Example 3

Figure 3:
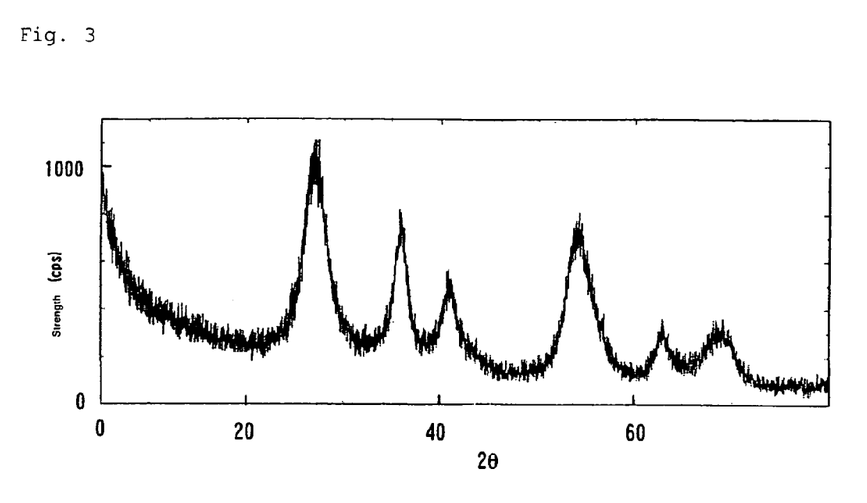
FIG. 3 shows the result of powder X-ray diffraction in Example 3.

The same operation as in Example 1 was carried out except that 0.9 g of tin (IV) chloride pentahydrate in Example 1 was used (concentration of Ti introduced: 0.45, Sn/Ti: 0.1). The solid content of the obtained sol was analyzed in the same manner as in Example 1. The result showed the rutile-type titanium dioxide having an average short axis and an average long axis of the crystal grain diameter of 5 nm and 8 nm respectively, and an average agglomerated particle diameter of 20 nm. The element molar ratio of Sn/Ti was 0.06. The refractive index of the solid content was evaluated in the same manner as in Example 1 to obtain n=2.65. The results of powder X-ray diffraction are shown in FIG. 3.

Example 4

Figure 4:
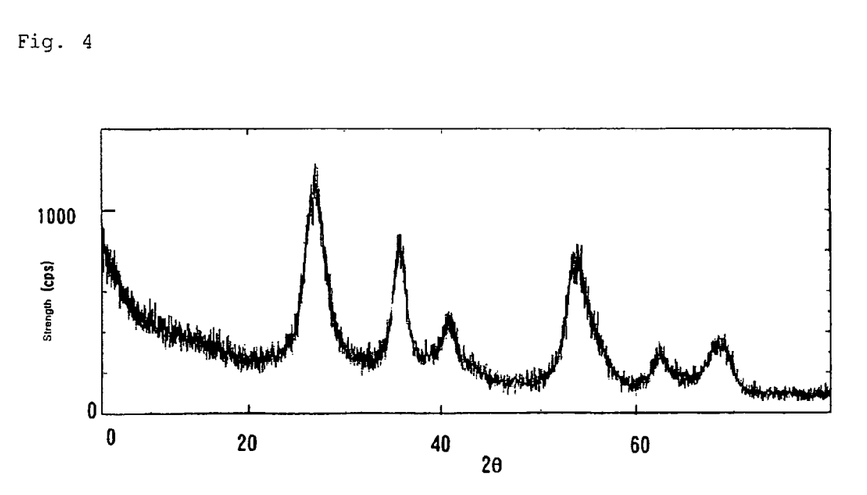
FIG. 4 shows the result of powder X-ray diffraction in Example 4.

The same operation as in Example 1 was carried out except that 4.3 g of tin (IV) chloride pentahydrate in Example 1 was used (concentration of Ti introduced: 0.45, Sn/Ti: 0.5). The solid content of the obtained sol was analyzed in the same manner as in Example 1. The result showed the rutile-type titanium dioxide having an average short axis and an average long axis of the crystal grain diameter of 4 nm and 6 nm respectively, and an average agglomerated particle diameter of 15 nm. The element molar ratio of Sn/Ti was 0.18. The refractive index of the solid content was evaluated in the same manner as in Example 1 to obtain n=2.47. The results of powder X-ray diffraction are shown in FIG. 4.

Example 5

Figure 5:
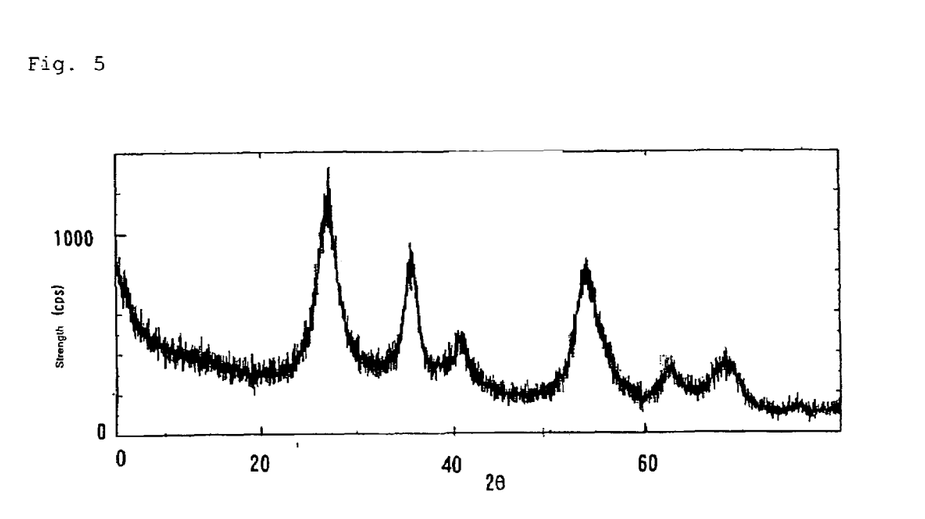
FIG. 5 shows the result of powder X-ray diffraction in Example 5.

The same operation as in Example 1 was carried out except that 8.6 g of tin (IV) chloride pentahydrate in Example 1 was used (concentration of Ti introduced: 0.45, Sn/Ti: 1). The solid content of the obtained sol was analyzed in the same manner as in Example 1. The result showed the rutile-type titanium dioxide having an average short axis and an average long axis of the crystal grain diameter of 5 nm and 6 nm respectively, and an average agglomerated particle diameter of 15 nm. The element molar ratio of Sn/Ti was 0.27. The results of powder X-ray diffraction are shown in FIG. 5.

Example 6

The same operation as in Example 3 was carried out except that the reaction temperature in Example 3 was set to 100 degree centigrade (concentration of Ti introduced: 0.45, Sn/Ti: 0.1). The solid content of the obtained sol was analyzed in the same manner as in Example 1, and as a result, an average short axis and an average long axis of the crystal grain diameter were 6 nm and 9 nm respectively.

(Preparation of Fine Particles of a Tin-Modified Rutile-Type Titanium Dioxide Coated with Zirconium Oxide and a Sol Thereof)

Example 7

To 230 g of the sol of fine particles of a tin-modified rutile-type titanium dioxide prepared in Example 3 was added concentrated hydrochloric acid to adjust the pH to 0.9, and then 6 g of zirconium oxide chloride octahydrate was added thereto. The resulting mixture was heated at 85 degree centigrade for 5 hours and then deionization was carried out by ultrafiltration to give a sol containing 5.8 weight % of the solid content. The solvent was converted to methanol by a rotary evaporator to give a methanol-dispersed sol containing 20 weight % of the solid content.

(Preparation of Fine Particles of a Tin-Modified Rutile-Type Titanium Dioxide Coated with Antimony Oxide and a Sol Thereof)

Example 8

0.5 g of antimony pentoxide was added to 5 g of water. While stirring and suspending the mixture, diisopropylamine was added thereto for dissolving antimony pentoxide (antimonate aqueous solution).

To the antimonate aqueous solution, 122 g of the sol of fine particles of a tin-modified rutile-type titanium dioxide prepared in Example 3 was added. The resulting mixture was heated at 90 degree centigrade for 3 hours and then deionization was carried out by ultrafiltration to give a sol containing 5.8 weight % of the solid content. The solvent was converted to methanol by a rotary evaporator to give a methanol-dispersed sol containing 20 weight % of the solid content. After hot air drying at 120 degree centigrade for 2 hours, elemental analysis was carried out according to the inductively coupled plasma analysis. As a result, the element molar ratio of Sb/Sn/Ti was 0.22/0.07/1.

(Preparation of Fine Particles of a Tin-Modified Rutile-Type Titanium Dioxide Coated with Antimony Oxide and Zirconium Oxide and a Sol Thereof)

Example 9

A sol of fine particles of a tin-modified rutile-type titanium dioxide coated with zirconium oxide containing 1.2 weight % of the solid content was prepared in the same manner as in Example 7 except that 1.2 g of zirconium oxide chloride in Example 7 was used.

Fine particles of a tin-modified rutile-type titanium dioxide coated with antimony oxide and zirconium oxide, and a sol thereof were prepared in the same manner as in Example 8 except that the sol prepared as described above was used instead of the sol used in Example 8.

(Preparation of Fine Particles of a Tin-Modified Rutile-Type Titanium Dioxide Coated with Molybdenum Oxide and a Sol Thereof)

Example 10

0.5 g of molybdenum oxide was added to 15 g of ion exchange water. While stirring and suspending the mixture, 0.75 g of diisopropylamine was added thereto for dissolving molybdenum oxide. 77 g of the sol of fine particles of a tin-modified rutile-type titanium dioxide prepared in Example 3 was added to this aqueous solution. The resulting mixture was heated at 90 degree centigrade for 4 hours and then deionization was carried out by ultrafiltration to give a sol containing 5.8 weight % of the solid content. The solvent was converted to methanol by a rotary evaporator to give a methanol-dispersed sol containing 20 weight % of the solid content.

(Preparation of Fine Particles of a Tin-Modified Rutile-Type Titanium Dioxide Coated with Tungsten Oxide and a Sol Thereof)

Example 11

0.5 g of ammonium tungstate pentahydrate was added to 15 g of ion exchange water. While stirring and suspending the mixture, 1.3 g of diisopropylamine was added thereto for dissolving ammonium tungstate pentahydrate. 77 g of the sol of fine particles of a tin-modified rutile-type titanium dioxide prepared in Example 3 was added to this aqueous solution. The resulting mixture was heated at 90 degree centigrade for 3 hours and then deionization was carried out by ultrafiltration to give a sol containing 5.8 weight % of the solid content. The solvent was converted to methanol by a rotary evaporator to give a methanol-dispersed sol containing 20 weight % of the solid content.

(Preparation of Fine Particles of a Tin-Modified Rutile-Type Titanium Dioxide Coated with Bismuth Oxide and a Sol Thereof)

Example 12

0.5 g of bismuth oxide was added to 15 g of ion exchange water. While stirring and suspending the mixture, 1 normal hydrochloric acid was added thereto until the pH became 0.6 for dissolving bismuth oxide. 77 g of the sol of fine particles of a tin-modified rutile-type titanium dioxide prepared in Example 3 was added to this aqueous solution. The resulting mixture was heated at 90 degree centigrade for 4 hours and then deionization was carried out by ultrafiltration to give a sol containing 5.8 weight % of the solid content. The solvent was converted to methanol by a rotary evaporator to give a methanol-dispersed sol containing 20 weight % of the solid content.

(Preparation of a Coating Liquid)

Example 13

3.5 g of 0.001 normal hydrochloric acid was added dropwise to 15 g of (3-glycidoxypropyl)trimethoxysilane over 2 hours, followed by stirring for 3 hours. 30 g of ethyl cellosolve was added thereto to give a partial hydrolysate solution of (3-glycidoxypropyl)trimethoxysilane. Then, to 9.3 g of the methanol sols (concentration of the whole solid content: 20 weight %) obtained in Examples 7 to 12 was added 5.3 g of the aforementioned partial hydrolysate solution of (3-glycidoxypropyl)trimethoxysilane. 50 mg of aluminium acetylacetonate as a curing agent and 10 mg of a surfactant (L7604, a product of Nippon Unicar Co., Ltd.) were further added thereto and stirred to prepare a coating liquid.

(Preparation of a Hard Coat Film)

Example 14

A resin lens (MR-1.74, manufactured by Mitsui Chemicals, Inc.) having a refractive index of 1.74 was prepared, immersed in an aqueous solution of sodium hydroxide, subjected to ultrasonic cleaning and dried. Each coating liquid obtained in Example 13 was applied on this substrate according to a spin coating method. The resultant was heated at 90 degree centigrade for 30 minutes and then at 120 degree centigrade for 2 hours for curing a coat film. The thickness of the hard coat film thus obtained was 2 μm.

(Preparation of a Primer Coating Liquid)

Example 15

9.3 g of the methanol sol (solid content: 20 weight %) prepared in Example 8 was added to an aqueous dispersion (Super Flex 150; manufactured by Dai-ichi Kogyo Seiyaku, Co. Ltd.) of a polyurethane resin (concentration of the whole solid content: 30 weight %) and ethyl cellosolve was further added thereto to prepare a coating liquid containing 8 weight % of the whole solid content.

(Preparation of a Primer Film)

Example 16

A resin lens (MR-1.74, manufactured by Mitsui Chemicals, Inc.) having a refractive index of 1.74 was prepared, immersed in an aqueous solution of sodium hydroxide, subjected to ultrasonic cleaning and dried. The coating liquid obtained in Example 15 was applied on this substrate according to a spin coating method. The resultant was heat-dried at 83 degree centigrade for 1 hour and then at 120 degree centigrade for 30 minutes to prepare a coat film. The thickness of the coat film thus obtained was 1 μm.

(Preparation of a Primer Film-Attached Hard Coat Film)

Example 17

A hard coat film was prepared in the same manner as in Example 14 on a substrate of a primer film-provided ophthalmic lens in Example 16.

(Preparation of a Light Curable Coating Liquid)

Example 18

To 15 g of ethyl cellosolve were added 1.6 g of urethane acrylate oligomer (UA306I, manufactured by Kyoeisha Chemical Co., Ltd.) and 0.05 g of a polymerization initiator (Darocure 1173, manufactured by Chiba Specialty Chemicals Corp.). Then, 9.3 g of the methanol sols (whole solid content: 20 weight %) obtained in Examples 7 to 12 was added to prepare a coating liquid.

(Preparation of a Light Curable Coat Film)

Example 19

A resin lens (MR-1.74, manufactured by Mitsui Chemicals, Inc.) having a refractive index of 1.74 was prepared, immersed in an aqueous solution of sodium hydroxide, subjected to ultrasonic cleaning and dried. The coating liquid obtained in Example 18 was applied on this substrate according to a spin coating method and irradiated with a high pressure mercury lamp (160 W/cm) for curing the coat film. The thickness of the coat film thus obtained was 2 μm. An interference fringe was not found at all.

Comparative Example 1

The same operation as in Example 1 was carried out except that tin (IV) chloride pentahydrate in Example 1 was not added (concentration of Ti introduced: 0.45, Sn/Ti: 0). The solid content of the obtained sol was analyzed in the same manner as in Example 1. The result showed the rutile-type titanium dioxide having an average short axis and an average long axis of the crystal grain diameter of 7 nm and 9 nm respectively, and an average agglomerated particle diameter of not less than 200 nm.

Comparative Example 2

Figure 6:
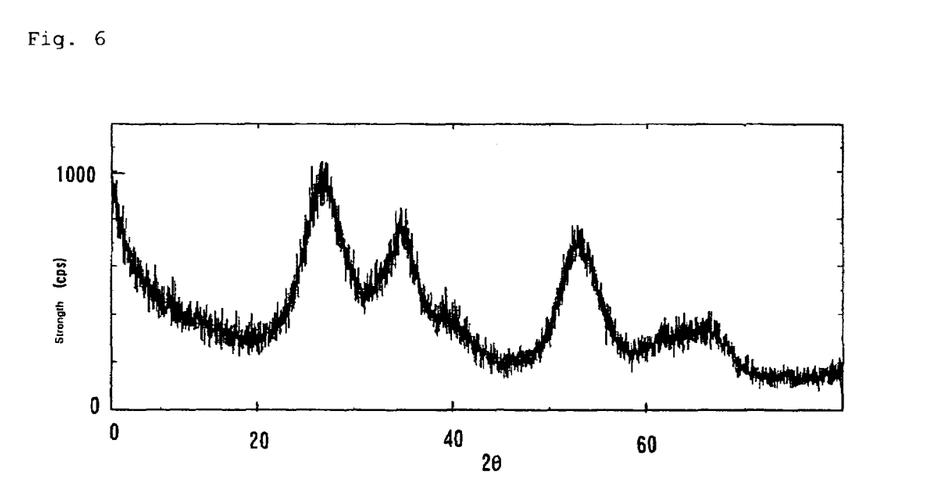
FIG. 6 shows the result of powder X-ray diffraction in Comparative Example 2.

The same operation as in Example 5 was carried out except that ion exchange water added in Example 5 was changed to 500 ml (concentration of Ti introduced: 0.05, Sn/Ti: 1). The solid content of the obtained sol was analyzed in the same manner as in Example 1, and as a result, a crystal of a rutile-type tin oxide was generated, but a rutile-type titanium dioxide was not obtained from the results of powder X-ray diffraction measurements. The results of powder X-ray diffraction are shown in FIG. 6.

Comparative Example 3

The same operation as in Example 1 was carried out except that ammonia water (containing 28 to 30 weight % of ammonia) was added to an aqueous solution of tin (IV) chloride pentahydrate and titanium dioxide chloride in Example 1, and the resulting mixture was reacted with a solution having the pH of 4. The reaction solution turned to turbid and a rutile-type titanium dioxide was not generated.

Comparative Example 4

To 2 L of ion exchange water was added 20 ml of aqueous hydrochloric acid solution of titanium dioxide chloride (Ti content: 15 weight %). The resulting mixture was heated at 60 degree centigrade for 6 hours and cooled down to room temperature, and then concentration and deionization were carried out by ultrafiltration to give a sol containing 1.3 weight % of the solid content. The solid content of the obtained sol was analyzed in the same manner as in Example 1, and as a result, it was the anatase-type titanium dioxide having a short axis and a long axis of a crystal grain diameter of 5 nm on an average. The refractive index of the solid content was analyzed in the same manner as in Example 1 to obtain n=2.52.

(Preparation of a Sol of Fine Particles of an Anatase-Type Titanium Dioxide Coated with Zirconium Oxide)

Comparative Example 5

A sol of fine particles of a tin-modified anatase-type titanium dioxide coated with zirconium oxide was prepared in the same manner as in Example 7 except that the sol of fine particles of an anatase-type titanium dioxide prepared in Comparative Example 4 in Example 7 was used.

(Preparation of a Sol of Fine Particles of an Anatase-Type Titanium Dioxide Coated with Antimony Oxide)

Comparative Example 6

A sol of fine particles of a tin-modified anatase-type titanium dioxide coated with antimony oxide was prepared in the same manner as in Example 8 except that the sol of fine particles of an anatase-type titanium dioxide prepared in Comparative Example 4 in Example 8 was used.

(Preparation of a Sol of Fine Particles of an Anatase-Type Titanium Dioxide Coated with Molybdenum Oxide)

Comparative Example 7

A sol of fine particles of a tin-modified anatase-type titanium dioxide coated with molybdenum oxide was prepared in the same manner as in Example 10 except that the sol of fine particles of an anatase-type titanium dioxide prepared in Comparative Example 4 in Example 10 was used.

(Preparation of a Coating Liquid)

Comparative Example 8

A coating liquid was prepared in the same manner as in Example 13 except that the sols prepared in Comparative Examples 4 to 7 in Example 13 were used.

(Preparation of a Hard Coat Film)

Comparative Example 9

A hard coat film was prepared in the same manner as in Example 14 except that the above coating liquid was used.

As shown below, the lens substrates with a hard coat film provided by the above methods were evaluated in terms of an interference fringe, scratch resistance, and photo-durability, and the coating liquids were evaluated in terms of dispersion stability. The results thereof are shown in Table 1.

(a) Interference fringe: An optical member having a hard coat film was visually observed under a fluorescent lamp. The criteria are as follows.
○: hardly shown
Δ: a little shown
x: considerably shown (b) Scratch resistance: The surface was rubbed with a steel wool (#000) with a load of 500 g. Then, the degree of scratch was visually evaluated. The criteria are as follows.
○: hardly scratched
Δ: a little scratched
x: severely scratched (c) Test of photo-durability: The obtained hard coat film-attached substrate was irradiated with light for 300 hours using a solar simulator (Type: sss-252161-ER, manufactured by Ushio Inc.) and then at the adhesiveness test, substrates with no peeling and no yellowing were marked with ○. The adhesiveness between the substrate and the hard coat film was carried out by the cross-cut tape test in accordance with JIS K-5600. That is, the substrate surface was separated by a slit that was 1 mm apart using a knife for forming 25 scale cells of 1 square mm. Then, a cellophane adhesive tape was used to strongly press thereon, abruptly peeled away from the surface in the direction of 90 degrees, and then scale cells remained on the coat film were taken for the adhesiveness indexes.

○: no peeling (25/25)
x: peeling (not more than 24/25)

(d) Dispersion stability: After the prepared coating liquid was kept at room temperature for 1 month, its change was evaluated using the following indexes.

○: no change
Δ: thickened
x: gelated (e) Measurement of a refractive index of a coat film: The coating liquid was applied on the quartz substrate by a spin coating method to have a film thickness of about 700 Å. The hot air-dried coat film was measured for its refractive index by using an automatic wavelength scanning ellipsometer M-150 (manufactured by JASCO Corp.).

TABLE 1

| Example | Sol used | Interference fringe | Scratch resistance | Photo-durability | Dispersion stability | Refractive index of a coat film |
|---|---|---|---|---|---|---|
| Example 14 | Example 7 | ○ | ○ | ○ | ○ | 1.72 |
| | Example 8 | ○ | ○ | ○ | ○ | 1.72 |
| | Example 9 | ○ | ○ | ○ | ○ | 1.72 |
| | Example 10 | ○ | ○ | ○ | ○ | 1.72 |
| | Example 11 | ○ | ○ | ○ | ○ | 1.72 |
| | Example 12 | ○ | ○ | ○ | ○ | 1.72 |
| Example 17 | Example 8 | ○ | ○ | ○ | ○ | 1.72 |
| Comparative Example 8 | Comparative Example 4 | ○ | ○ | X | X | 1.72 |
| | Comparative Example 5 | X | ○ | ○ | ○ | 1.65 |
| | Comparative Example 6 | X | ○ | ○ | ○ | 1.65 |
| | Comparative Example 7 | X | ○ | ○ | ○ | 1.65 |

INDUSTRIAL APPLICABILITY

Fine particles of a tin-modified rutile-type titanium dioxide, the sol thereof and the coating liquid obtained according to the present invention are properly used for a high refractive index hard coat film of a high refractive index plastic lens, a plastic deterioration preventive additive, a cosmetic additive, optical members such as a camera lens, an automobile window glass, a plasma display, a liquid crystal display, an EL display, an optical filter and the like, products of a metal material, a ceramics material, a glass material and a plastic material used for adjusting a refractive index, and the like, as a high refractive index forming agent, a ray reflecting agent, an ultraviolet absorber and the like.

When fine particles of a tin-modified rutile-type titanium dioxide coated with a metal oxide, the sol thereof and the coating liquid of the present invention are applied on the substrate, the resulting material is excellent in scratch resistance, surface hardness, abrasion resistance, adhesiveness, transparency, heat resistance, photo-durability, weather resistance, ultraviolet interrupting property and the like, and can be usefully used to provide a high refractive index hard coat film of a high refractive index plastic lens which is free from the generation of an interference fringe, a plastic deterioration preventive additive, a cosmetic additive, optical members such as a camera lens, an automobile window glass, a plasma display, an EL display, a liquid crystal display, a high refractive index film for inputting and recording high density recording optical media, an optical filter and the like, and optical members such as a metal material, a ceramics material, a glass material, a plastic material for adjusting a refractive index and the like.

The invention claimed is:

1. A producing method for fine particles of a tin-modified rutile-type titanium dioxide comprising initiating the reaction of an aqueous solution of a titanium compound having a Ti concentration of 0.07 to 5 mol/l at a pH in the range of −1 to 3 in the co-presence of a tin compound at a molar ratio of tin to titanium (Sn/Ti) of 0.001 to 2, wherein said fine particle has an Sn/Ti composition molar ratio of 0.001 to 0.5, and a short axis and a long axis of a crystal grain diameter thereof have a length of 2 to 20 nm, wherein a crystal of aggregated fine particles comprising said fine particles of a tin-modified rutile-type titanium dioxide has an average agglomerated particle diameter of from 10 to 100 nm.

2. The producing method for fine particles of a tin-modified rutile-type titanium dioxide as set forth in claim 1, wherein said fine particle of a tin-modified rutile-type titanium dioxide is coated with one or more metal oxides.

3. The producing method for fine particles of a tin-modified rutile-type titanium dioxide as set forth in claim 1, wherein the fine particles have a refractive index is from 2.0 to 2.8.

4. A sol comprising the fine particles of a tin-modified rutile-type titanium dioxide produced by the method as set forth in claim 1 dispersed in water or an organic solvent.

5. A coating liquid comprising the fine particles of a tin-modified rutile-type titanium dioxide produced by the method as set forth in claim 1 and at least one selected from the group consisting of an organic silicon compound, its hydrolysate, and its condensate.

6. A hard coat film obtained by curing the coating liquid as set forth in claim 5.

7. The hard coat film as set forth in claim 6, wherein a refractive index is from 1.5 to 1.8.

8. A substrate provided with the hard coat film as set forth in claim 6.

9. The substrate as set forth in claim 8, wherein the substrate has a refractive index of from 1.6 to 1.8.

10. The substrate as set forth in claim 8, wherein the substrate is a resin having a thiourethane bond or an epithiosulfide bond.

11. A substrate further comprising an antireflection film provided on the substrate as set forth in claim 8.

12. A coating liquid comprising one or more kinds of resins or resin monomers and the fine particles of a tin-modified rutile-type titanium dioxide produced by the method as set forth in claim 1.

13. A primer film obtained by curing the coating liquid as set forth in claim 12.

14. The primer film as set forth in claim 13, wherein a refractive index is from 1.5 to 1.8.

15. A substrate provided with the primer film as set forth in claim 13.

16. A substrate as set forth in claim 15 provided with a hard film on the primer film, said hard film obtained by curing a coating liquid comprising fine particles of a tin-modified rutile-type titanium dioxide obtained through the reaction of an aqueous solution of a titanium compound having a Ti concentration of 0.07 to 5 mol/l at a pH in the range of −1 to 3 in the co-presence of a tin compound at a molar ratio of tin to titanium (Sn/Ti) of 0.001 to 2, wherein said fine particle has an Sn/Ti composition molar ratio of 0.001 to 0.5, and a short axis and a long axis of a crystal grain diameter thereof having a length of 2 to 20 nm, and at least one selected from the group consisting of an organic silicon compound, its hydrolysate, and its condensate.

17. A coating liquid comprising one or more kinds of light curable monomers and the fine particles of a tin-modified rutile-type titanium dioxide produced by the method as set forth in claim 1.

18. A hard coat film obtained by curing the coating liquid as set forth in claim 17.

19. The hard coat film as set forth in claim 18, wherein a refractive index is from 1.5 to 1.8.

20. A substrate provided with the hard coat film as set forth in claim 18.

* * * * *